United States Patent
Komori et al.

[11] Patent Number: 6,151,350
[45] Date of Patent: Nov. 21, 2000

[54] GAS LASER

[75] Inventors: Hiroshi Komori; Yoshiho Amada; Osamu Wakabayashi, all of Oyama, Japan

[73] Assignee: Komatsu Ltd., Tokyo, Japan

[21] Appl. No.: 09/155,184

[22] PCT Filed: Mar. 17, 1997

[86] PCT No.: PCT/JP97/00845

§ 371 Date: Sep. 22, 1998

§ 102(e) Date: Sep. 22, 1998

[87] PCT Pub. No.: WO97/36352

PCT Pub. Date: Oct. 2, 1997

[30] Foreign Application Priority Data

Mar. 22, 1996 [JP] Japan ................................. 8-093179

[51] Int. Cl.$^7$ ...................................................... H01S 3/22
[52] U.S. Cl. ................................................. 372/59; 372/57
[58] Field of Search ............................... 372/59, 57

[56] References Cited

U.S. PATENT DOCUMENTS

| | | | |
|---|---|---|---|
| 5,090,020 | 2/1992 | Bedwell ...................................... | 372/59 |
| 5,440,578 | 8/1995 | Sandstrom ................................. | 372/57 |
| 5,450,436 | 9/1995 | Mitzoguchi et al. ....................... | 372/57 |
| 5,642,374 | 6/1997 | Wakabayashi et al. .................... | 372/57 |

FOREIGN PATENT DOCUMENTS

| | | |
|---|---|---|
| 6218587 | 11/1985 | Japan . |
| 62-118587 | 5/1987 | Japan . |
| 1-100984 | 4/1989 | Japan . |
| 4-100285 | 4/1992 | Japan . |

*Primary Examiner*—Frank G. Font
*Assistant Examiner*—Armando Rodriguez
*Attorney, Agent, or Firm*—Sidley & Austin

[57] ABSTRACT

A gas laser outputs a prescribed high power from the start of laser oscillation immediately after the laser gas is changed. The laser, in which used laser gas in a laser chamber (1) is replaced with a fresh laser gas, is provided with: a gas leaving means, which leaves a prescribed amount of used gas for mixing with the fresh laser gas during laser gas replacement, or an impurity gas adding means which provides a prescribed amount of impurity gas for mixing with the fresh laser gas; and a controller (11). It is preferable that the concentration of the used gas after a replacement is within a range of 1.5–60%. The gas leaving means can be a gas discharge control mechanism (10), which controls the amount of used gas exhausted so that a prescribed amount of used gas can be left for mixing with the fresh gas, or a laser gas container (21), which can provide a prescribed amount of stored used gas for mixing with the fresh gas. The impurity gas adding means can be a laser gas cylinder containing a prescribed concentration of impurity gas or an impurity gas container (44).

12 Claims, 10 Drawing Sheets

GAS LASER

TECHNICAL FIELD

The present invention relates to a gas laser which is used as a light source for material machining, material modification, projection exposure, and the like, and in particular, to an excimer laser.

BACKGROUND ART

Gas lasers are used as light sources for material machining, such as marking on products, and boring, cutting, and modification of material. In particular, rare-gas halogen excimer lasers are used as light sources for marking on organic material, ablation processing, microfabrication of general material, surface modification, photochemical reaction, and the like. Such rare-gas halogen excimer lasers are also used in the processor manufacturing semiconductor products. For example, they can be used as light sources of projection aligners used in optical lithography for forming circuit patterns on semiconductors. Further, fluorine excimer lasers, which have mechanisms comparable with those of the rare-gas halogen excimer lasers and are provided for generating ultraviolet rays shorter in wavelength than those from the rare-gas halogen excimer lasers, are expected to be used in the same fields as the rare-gas halogen excimer lasers are used. Hereinbelow, the rare-gas halogen excimer lasers and the fluorine excimer lasers are generically called the excimer lasers.

Figure 15:
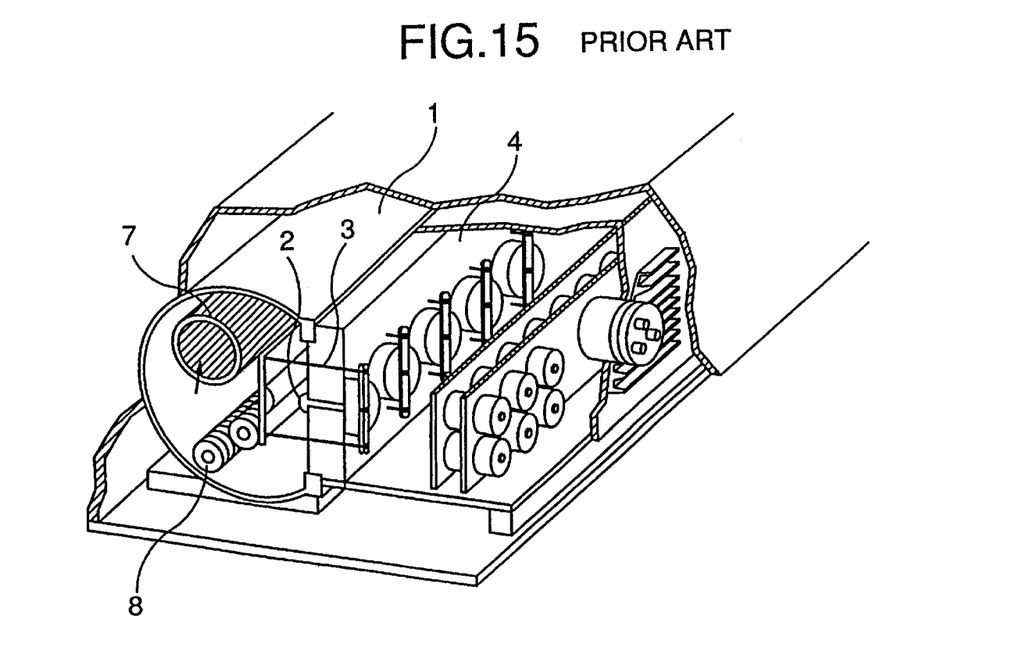
FIG. 15 is a perspective view of a conventional gas laser.

FIG. 15 is a perspective view illustrating the structure of a typical conventional discharge-pumped gas laser. The following description is made based on the drawing. A laser chamber 1 is a container filled with laser medium gas (hereinafter, referred to as laser gas) for oscillating laser light. Provided inside the laser chamber 1 are a main discharge electrode 2, for performing glow discharge to excite or pump the laser gas, and a preionization electrode 3, for performing preionized discharge to generate initial electrons in a main discharge space of the main discharge electrode 2. Also provided inside the laser chamber 1 are a fan 7, for circulating the laser gas to supply laser gas into the main discharge space, and a heat exchanger 8, for cooling the laser gas whose temperature has risen due to discharge energy. Provided outside the laser chamber 1 is a high-voltage pulsed power source 4 for supplying the main discharge electrode 2 and the preionization electrode 3 with discharge energy. A capacitor is provided inside the high-voltage pulsed power source 4 for storing the discharge energy. The discharge energy is controlled by controlling a charging voltage across the capacitor. The laser gas used can be a mixture of carbon dioxide gas, helium gas and nitrogen gas in case of carbon dioxide gas lasers; a mixture gas of fluorine, krypton, and a buffer gas (helium or neon) in case of Kr F excimer lasers; and a mixture of fluorine, argon, and a buffer gas (helium or neon) in case of Ar F excimer lasers.

In typical gas lasers, a component gas showing relatively high reactiveness, e.g., a fluorine gas, reacts while adhering to the inside of the laser chamber 1 or to the surfaces of the fan 7 and the heat exchanger 8. The component gas also reacts while being adsorbed onto the surfaces of metal particles caused by sputtering of electrode material at the time of discharge-pumping. Thus, the concentration of the component gas showing relatively high reactiveness decreases with time. On the other hand, the component gas reacts with moisture in the laser chamber 1, a hydrogen atom occluded into the metal or a hydrogen atom in a high polymer such as a seal material or lubricant used in the laser chamber 1, to generate an impurity gas, resulting in an increase in the concentration of the impurity gas.

When the concentration of the component gas in the laser gas decreases to a prescribed value or less, or the concentration of the impurity gas increases to a prescribed value or more, the laser output power is reduced. In many cases, applications for the gas laser require that the laser output power be kept constant. In general, in order to keep the laser output power constant, the gas concentration is controlled by injecting a proper amount of component gas having relatively high reactiveness into the laser gas, or a charging voltage of the high-voltage pulsed power source 4 is controlled so that the power-on energy for pumping will increase.

However, the increase in the charging voltage is restricted due to a limited pressure resistance of the laser chamber 1 or such limited energy that the high-voltage pulsed power source 4 can charge. It is also necessary to maintain laser output characteristics (e.g., the width of spectral line or the beam width) other than the laser output power, and this restricts the injected amount of component gas. In other words, there is a limit to the control of the laser output power by the adjustment of the injected amount of component gas or the power-on energy. A laser gas, which no longer has the ability to control the laser output power, is called the "used laser gas" hereinbelow. When the control of the laser output power approaches the limit, the laser gas is generally replaced with fresh laser gas. The process to replace the laser gas can be performed as follows. The used laser gas in the laser chamber 1 is exhausted through an exhauster, not shown, so that the laser chamber 1 becomes a substantial vacuum. After that, a prescribed amount of fresh laser gas is injected into the laser chamber 1 from laser gas supplying means such as a laser gas cylinder, not shown. This makes it possible to restart the control of the laser output power, and hence to expect a constant output.

When all of the used laser gas is replaced with fresh laser gas, the gas laser is theoretically expected to make a high-level recovery of the laser output power from the start of laser oscillation immediately after the fresh laser gas is charged, but the laser output power immediately after the fresh laser gas is charged is actually reduced. Such a reduction in the laser output power takes place remarkably in excimer lasers, and is much more remarkable in Ar F excimer lasers and fluorine excimer lasers.

Figure 16:
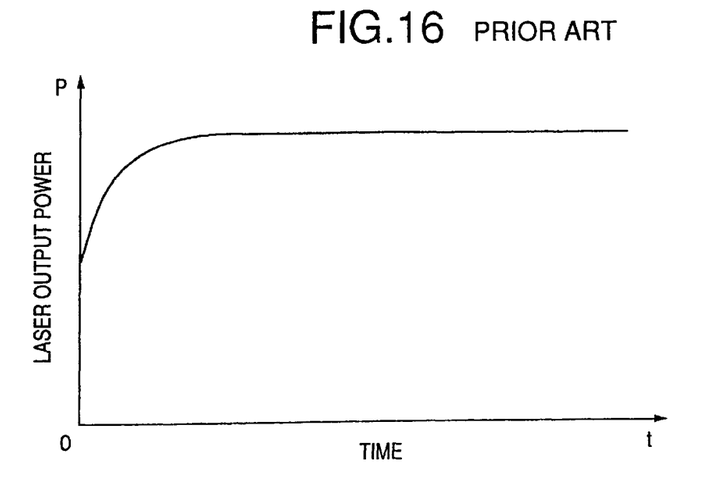
FIG. 16 is a graph for explaining the prior art, showing a time transition of laser output power from the time immediately after the laser gas is replaced.

FIG. 16 illustrates a time transition of the laser output power from the time immediately after the fresh laser gas is charged. This case assumes that excitation or pumping energy is kept constant without any control to maintain a constant output power such as injection of component gas. The output power has a tendency to start from a low value immediately after the fresh laser gas is charged, then gradually increase, and reach a normal value after a prescribed time has elapsed. Since the output power is very low immediately after the fresh laser gas is charged, a prescribed rated output power cannot be outputted even when the pumping energy is increased up to an upper limit. To solve such a problem, several methods, such as ones shown below, have been adopted without understanding why those methods are effective.

A first method is to leave the laser without oscillation for a period of about 10 minutes to one hour after the fresh laser gas is charged. When the laser starts oscillating after leaving it inactive, a prescribed rated output power can be obtained from the start of laser oscillation.

A second method is to perform laser oscillation for a period of about several minutes to one-half hour after the fresh laser gas is charged. In this case, the prescribed rated output power can be obtained earlier than the first method.

A third method is to increase the temperature of the fresh laser gas to a value between about 30 and 40 C. °. In this case, the prescribed rated output power can also be obtained earlier than the first method.

However, the first method for leaving the laser without oscillation after the fresh laser gas is charged causes a decreased operating ratio of the laser. Gas replacement generally takes 15 minutes or so, and the laser is required to stop oscillation for more than one hour maximum including the time required for gas replacement. This can cause a problem in that the laser reduces its production efficiency.

The second method, though able to reduce the time compared to the first method, also causes the laser to reduce its production efficiency due to an increased idle time of the laser. Further, energy consumed by laser oscillation for output power recovery is not directed to production, and such energy consumption is not preferable for conservation of energy. Besides, it can decrease the life of the laser and the laser gas.

Since the third method is to control the temperature of the laser gas in an optimum range, there is a need to adjust the flow rate of a refrigerant flowing through the heat exchanger 8, or to provide a laser gas temperature adjusting mechanism for adjusting the temperature of the refrigerant. This makes the entire laser mechanism complicated, resulting in decreased reliability.

SUMMARY OF THE INVENTION

The present invention has been made in consideration of the above conventional problems, and an object thereof is to provide a gas laser which can output a prescribed high laser output power from the start of laser oscillation immediately after fresh laser gas is charged.

In a first aspect of the present invention, there is provided a gas laser wherein used laser gas in a laser chamber is replaced with fresh laser gas when the laser output power cannot be controlled after oscillating laser light for more than a prescribed number of pulses, characterized in that gas leaving means is provided for leaving part of the used laser gas in the laser chamber for mixing with the fresh laser gas which is charged at the time of replacement.

Since part of the used laser gas is left in the laser chamber by the gas leaving means and is mixed with the fresh laser gas, the gas laser can oscillate laser light without any reduction in laser output power from the start of laser oscillation immediately after the fresh laser gas is charged. This makes it possible to improve production efficiency of the gas laser without any reduction in operating rate.

In a second aspect of the present invention, the concentration of used laser gas in the mixture with the newly introduced fresh laser gas is within a range of 1.5–60%.

Since used laser gas is left such that the concentration of the used laser gas is within a prescribed range, the gas laser can oscillate laser light more stably without any reduction in laser output power from the start of laser oscillation immediately after the fresh laser gas is charged.

In a third aspect of the present invention, the gas leaving means is a gas exhaust control mechanism for controlling exhausting of the used laser gas such that a prescribed amount of used laser gas is left in the laser chamber.

Since the gas laser performs laser oscillation with laser gas made up by mixing the used laser gas, left in the laser chamber by means of the gas exhaust control mechanism, and the newly injected fresh laser gas, the gas laser can oscillate laser light without any reduction in laser output power from the start of laser oscillation immediately after the fresh laser gas is charged. This makes it possible to improve the production efficiency of the gas laser without any reduction in the operating rate.

In a fourth aspect of the present invention, the gas leaving means is a laser gas storage container provided in the laser, which takes in the used laser gas from the laser chamber to store it, and injects a prescribed amount of used laser gas into the laser chamber.

Since the gas laser performs laser oscillation with new laser gas made up by mixing the prescribed amount of used laser gas, injected into the laser chamber by means of the laser gas storage container, and the newly injected fresh laser gas, the gas laser can oscillate laser light without any reduction in laser output power from the start of laser oscillation immediately after the replacement of the original laser gas.

In a fifth aspect of the present invention, the gas exhaust control mechanism includes a pressure sensor for detecting gas pressure in the laser chamber, a valve for exhausting used laser gas from the laser chamber, an a controller which outputs a driving command to the valve to leave a prescribed amount of used laser gas in the laser chamber based on a detection signal from the pressure sensor.

Since the controller controls the exhausting of used laser gas based on the detected gas pressure value, a prescribed amount of used laser gas can be left in the laser chamber with high precision. This allows the gas laser to oscillate laser light without any reduction in laser output power from the start of laser oscillation immediately after the replacement of the original laser gas.

In a sixth aspect of the present invention, the gas exhaust control mechanism includes a valve for exhausting the used laser gas from the laser chamber, and a controller, which measures a gas exhaust time from the start of exhausting the used laser gas, to output a driving command to the valve so as to leave a prescribed amount of used laser gas in the laser chamber based on the gas exhaust time.

Since the controller controls the gas exhaust based on the gas exhaust time, a prescribed amount of used laser gas can be left in the laser chamber with high precision. This allows the gas laser to oscillate laser light without any reduction in laser output power from the start of laser oscillation immediately after the replacement of the original laser gas.

In a seventh aspect of the present invention, the gas exhaust control mechanism includes a pressure control valve which exhausts the used laser gas when the gas pressure in the laser chamber exceeds a prescribed value, and stops the exhausting when the gas pressure becomes equal to or less than the prescribed value.

Since the pressure control valve exhausts the used laser gas such that gas pressure in the laser chamber becomes a prescribed value, a prescribed amount of used laser gas can be left in the laser chamber with high precision. This allows the gas laser to oscillate laser light without any reduction in laser output power from the start of laser oscillation immediately after the replacement of the original laser gas.

In an eighth aspect of the present invention, there is provided a gas laser wherein used laser gas in a laser chamber is replaced with fresh laser gas when the laser output power cannot be controlled after oscillating laser light for more than a prescribed number of pulses, characterized in that impurity gas adding means is provided for mixing a prescribed amount of impurity gas with the fresh gas which is charged at the time of replacement.

Since a prescribed amount of impurity gas is mixed with the fresh laser gas by the impurity gas adding means, and the resulting mixed laser gas is used for laser oscillation, the gas laser can oscillate laser light securely without any reduction in laser output power from the start of laser oscillation immediately after the laser gas is changed. This makes is possible to improve production efficiency of the gas laser without any reduction in operating rate.

In a ninth aspect of the present invention, the impurity gas adding means is a laser gas cylinder filled with laser gas containing a prescribed concentration of impurity gas.

If a prescribed amount of laser gas is injected from the laser gas cylinder into the laser chamber, the gas laser can oscillate laser light without any reduction in laser output power from the start of laser oscillation immediately after the original laser gas is replaced.

In a tenth aspect of the present invention, the impurity gas adding means includes an impurity gas container for storing an impurity gas, a valve opened or closed for controlling injection of the impurity gas from the impurity gas container into the laser chamber, and a controller which outputs a driving command to the valve to provide a prescribed amount of impurity gas for mixing with the fresh laser gas.

Thus, the controller controls the amount of impurity gas injected from the impurity gas container into the laser chamber such that a prescribed amount of impurity gas is mixed with the fresh laser gas. The resulting mixed laser gas is used for laser oscillation, and this allows the gas laser to oscillate laser light without any reduction in laser output power from the start of laser oscillation immediately after the replacement of the original laser gas.

In an eleventh aspect of the present invention, the impurity gas adding means includes an impurity gas generator for generating impurity gas, a valve opened or closed for controlling injection of the impurity gas from the impurity gas generator into the laser chamber, and a controller which outputs a driving command to the valve to provide a prescribed amount of impurity gas for mixing with the fresh laser gas.

Thus, the controller controls the amount of impurity gas injected from the impurity gas generator into the laser chamber such that a prescribed amount of impurity gas is mixed with the fresh laser gas. The resulting mixed laser gas is used for laser oscillation, and this allows the gas laser to oscillate laser light without any reduction in laser output power from the start of laser oscillation immediately after the original laser gas is replaced.

In a twelfth aspect of the present invention, the impurity gas is composed of at least one of hydrogen fluoride (HF), carbon tetrafluoride ($CF_4$), and oxygen ($O_2$).

The addition of this kind of impurity gas allows the gas laser to oscillate laser light securely without any reduction in laser output power from the start of laser oscillation immediately after the replacement of the laser gas.

BEST MODES FOR CARRYING OUT THE INVENTION

As described above, the first to third countermeasures to the conventional problems have been carried out, but it has been unclear why those are effective. Proposers of this invention have elucidated that the reason is the concentration of impurity gas in the laser gas. In general, the impurity gas in the laser gas causes a decreased laser output power. However, it has been found that an optimum concentration of impurity gas for the laser output power appears in a certain kind of laser, e.g., an excimer laser. This phenomenon is further notable in an Ar F excimer laser and a fluorine excimer laser.

The basis of each countermeasure can be described as follows. In the first method, the reason for recovering the output is that, because the laser is left inactive without oscillation for a period of 10 minutes to one hour, a reaction of a high-reactive gas, such as a halogen gas, is promoted in the laser chamber 1 during this period, and hence the concentration of the impurity gas approaches the optimum value. In the third method, the reason for recovering the output is that, because the temperature of the laser gas is increased to a value of between 30 and 40 C. °, such a rate of reaction as to generate impurity gas in the laser chamber 1 is dependent on positive temperature. In this case, the concentration of the impurity gas can approach the optimum value earlier. In the second method, the reason for recovering the output is that, because the gas laser performs laser oscillation for a period of about several minutes to one-half hour after the laser gas is replaced, the temperature of the laser gas is increased by discharge-pumped energy at the time of this oscillation. It is thus considered that the concentration of the impurity gas can approach the optimum value even earlier.

The present invention has been made by taking this point into account, and a gas laser according to the present invention is provided with a used gas leaving means and an impurity gas adding means. The gas laser is such that the used gas leaving means leaves part of the used laser gas for mixing with newly introduced fresh laser gas, or the impurity gas adding means adds a prescribed amount of impurity gas for mixing with newly introduced fresh gas.

Figure 17A:
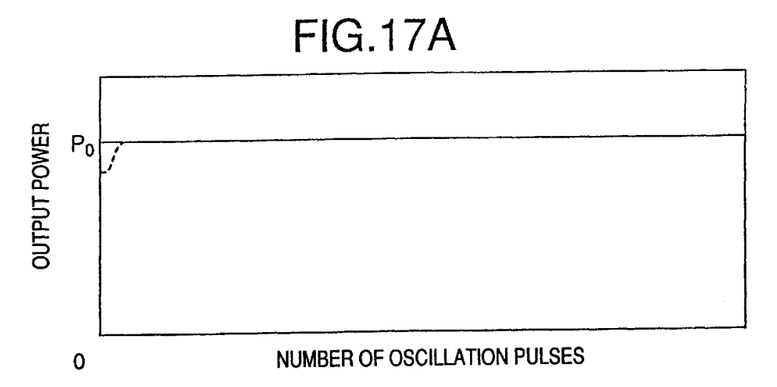
FIGS. 17A and 17B are graphs for explaining the effects of the present invention, showing time transitions of output power and charging voltage.
Figure 17B:
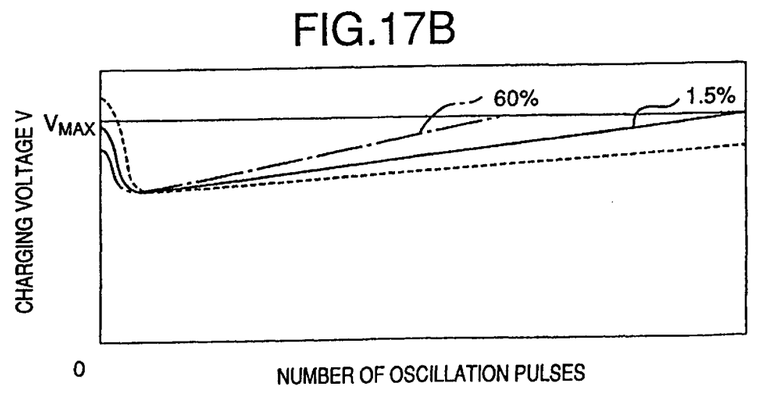

FIGS. 17A and 17B indicate the effects of the present invention with solid lines, which show time transitions of output power and charging voltage, respectively, with respect to the concentration of impurity gas when the charging voltage for discharge pumping of the high-voltage pulsed power source 4 is controlled so that the laser output power can be kept constant. In both figures, the abscissa indicates the number of laser oscillation pulses after the laser gas is replaced.

The broken line in FIG. 17A indicates a case where, after the laser gas is replaced, laser oscillation is performed by a typical laser other than that according to the present invention. In this case, as shown in FIG. 17B, the charging voltage required for maintaining a constant output power exceeds an upper limit $V_{MAX}$ that the laser can output in normal conditions. It is therefore impossible to apply such a required charging voltage in practical conditions. Thus, a prescribed output power $P_O$ cannot be obtained, as indicated by the broken line in FIG. 17A, resulting in a low output power.

On the other hand, if the laser according to the present invention is used such that part of the used laser gas is left for mixing with newly introduced fresh laser gas, the charging voltage, required for making the output power constant immediately after the laser gas is changed, decreases as the amount of residual used gas increases. Specifically, when the concentration of used laser gas is 1.5% of the total laser gas after replacement, the charging voltage reaches the upper limit $V_{MAX}$ as shown in FIG. 17B, thus obtaining a prescribed output power $P_O$. Further, the charging voltage, required for making the output power constant immediately after the laser gas is changed, decreases as the concentration of the amount of residual used laser gas increases. Thus, the prescribed output power $P_O$ can be obtained from the start of laser oscillation immediately after the laser gas is changed. It should be noted that, when the concentration of the amount of residual used gas increases excessively, deterioration of the laser gas is promoted. In this case, the charging voltage required for making the output power constant reaches the upper limit $V_{MAX}$ earlier according to the number of oscillation pulses, as shown in FIG. 17B. It is therefore preferable to control the concentration of the amount of residual used laser gas within a prescribed range. Proposers of this invention have found that an optimum concentration of impurity gas for the laser output power is 10%, and have determined that the laser output power at this time becomes the maximum. The most desirable range of impurity gas concentrations to be controlled is between 5 and 40%, but even in a range of 1.5 to 60%, the prescribed output power $P_O$ can be obtained from the start of laser oscillation immediately after the fresh laser gas is charged.

When an impurity gas is added into the laser gas instead of leaving part of the used laser gas for mixing with the fresh laser gas, the charging voltage can also be reduced immediately after the laser gas is changed. The impurity gas added here can be composed of at least one of several gases, such as hydrogen fluoride (HF), carbon tetrafluoride ($CF_4$), and oxygen ($O_2$). Thus, the prescribed output power can be obtained from the start of laser oscillation immediately after the laser gas is changed.

Next, concrete embodiments will be described in detail with reference to the drawings.

Figure 1:
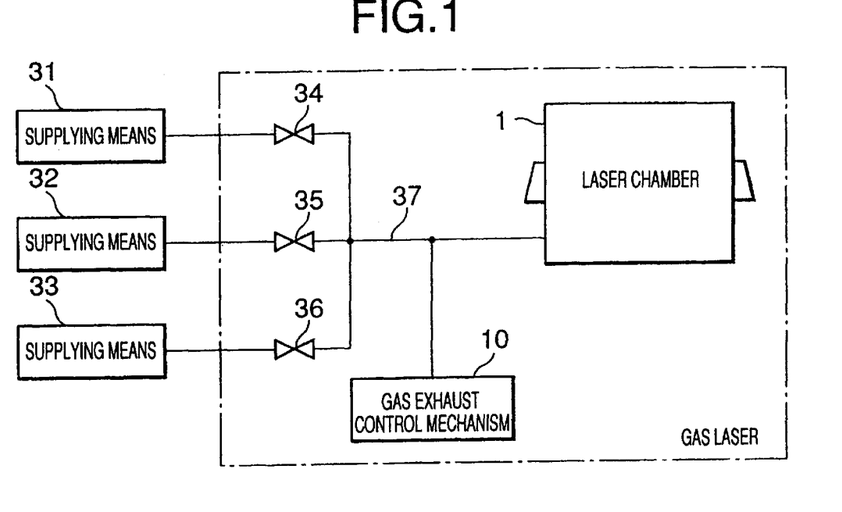
FIG. 1 is a diagram showing the basic structure of a gas laser according to the present invention.

FIG. 1 illustrates the basic structure of a gas laser according to the present invention. A connection of the laser chamber 1 to a gas exhaust control mechanism 10 is established directly or through a pipe so that the used laser gas can be exhausted by the gas exhaust control mechanism 10 at the time of changing the laser gas. Laser gas supplying means 31–33 supply fresh laser gas into the laser chamber 1, each of which is generally constituted by a gas cylinder filled with laser gas, a laser gas generator, and the like. For example, an Ar-F excimer laser can be provided with buffer gas supplying means 31 for supplying a buffer gas of neon or helium, argon supplying means 32 for supplying a mixture of argon and neon, and fluorine supplying means 33 for supplying a mixture of fluorine and neon. These gas supplying means 31–33 are connected to valves 34, 35, and 36, respectively. The valves 34, 35, and 36 are connected to the laser chamber 1 through a pipe 37. Thus, the amount of each laser gas supplied into the laser chamber 1 is adjusted by opening and closing the valves 34, 35, and 36. In general, a region enclosed by the broken line is incorporated in the gas laser, but the exhaust pump included in the gas exhaust control mechanism 10 could be arranged outside of the gas laser and connected through the pipe.

Figure 2:
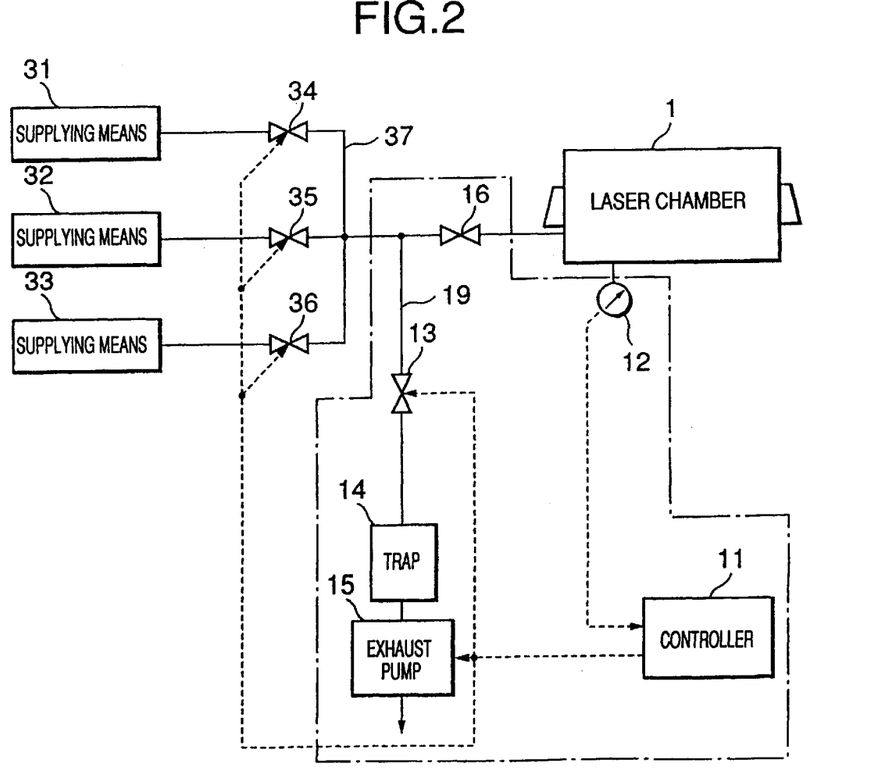
FIG. 2 is a diagram showing the structure of a gas laser according to a first embodiment.

FIG. 2 illustrates the structure of a gas laser of a first embodiment, in which component parts common to those in FIG. 1 are given the same reference numbers, and the description thereof is omitted.

A valve 16 is provided in a connection of the laser chamber 1 and the pipe 37. A pipe 19, branched from the pipe 37, is connected to an exhaust pump 15 via a valve 13 and a trap 14. The exhaust pump 15 acts to absorb and exhaust the used laser gas from the laser chamber 1 when the laser gas is changed, and can include a filter or the like with activated carbon contained for eliminating halogen gas. The trap 14, which is required when the gas laser is an excimer laser, adsorbs the halogen gas from the laser gas exhausted by the exhaust pump 15. Thus, the laser gas is exhausted after removing the halogen gas, which is poisonous to humans and exerts an evil influence such as an abnormal temperature rise upon the filter of the exhaust pump 15. A pressure sensor 12, for detecting inside gas pressure, is also provided in the laser chamber 1. Each valve 13, 16, or 34–36 can be solenoid valve or an air driven valve controlled by a solenoid valve. The valve 16 can be a manually actuable valve. A controller 11 outputs driving commands to each valve 13, 34–36 and to the exhaust pump 15. The detection signal from the pressure sensor 12 is inputted to the controller 11.

The controller 11 can be a computer system including a microcomputer as the main part. The controller 11 takes in other signals than the above signals, such as a monitoring signal for monitoring laser output power or other laser characteristics from a monitor, not shown, and other command signals from an external device, not shown, including a laser gas change command. When judging based on the monitoring signal that the laser gas is to be changed, or when receiving the laser gas change command from the external device, the controller 11 controls the drive of each relevant valve 13, 34–36 and the exhaust pump 15 while monitoring the detection signal from the pressure sensor 12, thus starting the replacement of the laser gas.

Figure 3:
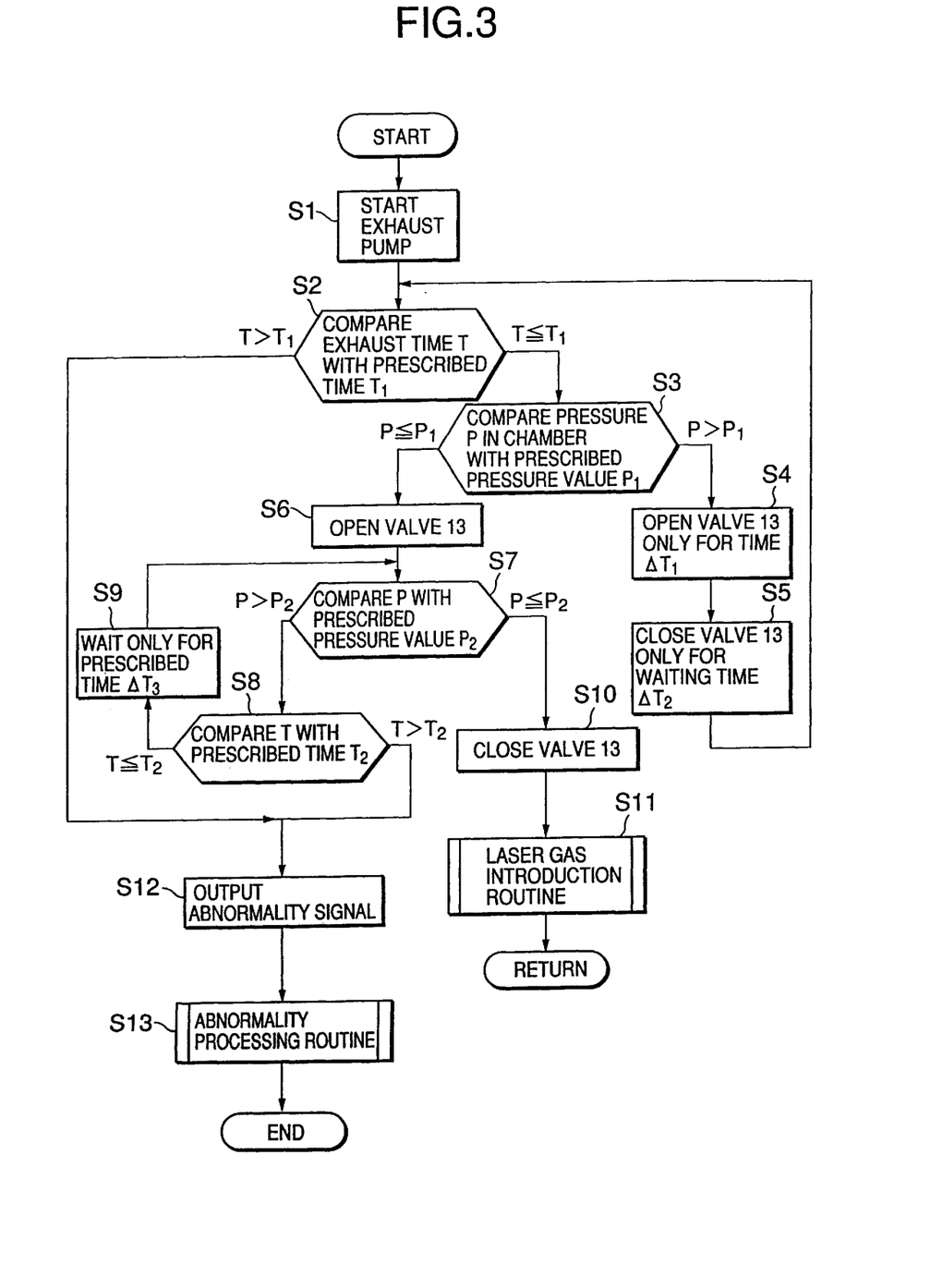
FIG. 3 is a flowchart of used laser gas leaving processing according to the first embodiment.

FIG. 3 is a flowchart of laser gas leaving processing executed by the controller 11 when the laser gas is to be changed. Referring to the drawing, the contents of the processing will be described in detail below. The flowchart of this processing is illustrated in a subroutine format, and all the descriptions below are made in the same manner. In this flowchart, the valve 16 is open, and the valves 13 and 34–36 are closed. Further, the following description is made by attaching S to each processing step number.

In S1, a driving command is outputted to the exhaust pump 15 to start exhausting the used laser gas. Then, in S2, an exhaust time T from the start of exhausting is checked to compare the exhaust time T with a prescribed time $T_1$. If the comparison result shows that the exhaust time T is equal to or less than the prescribed time $T_1$, a detected value P of the pressure sensor 12 is compared in S3 with a prescribed pressure value $P_1$. If the comparison result shows that the detected value P exceeds the prescribed pressure value $P_1$, the gas pressure in the laser chamber 1 is regarded as high, and S4 and S5 are executed for the protection of the exhaust pump 15 while gradually exhausting the used laser gas. In other words, the valve 13 is opened in S4 only for a prescribed time $\Delta T_1$, and closed in S5 only for a prescribed waiting time $\Delta T_2$. After that, the processing returns to S2, and S2 through S5 are repeated. Thus, the opening and closing of the valve 13 are repeated such that the valve 13 is closed during the prescribed waiting time $\Delta T_2$ after having been opened during the prescribed time $\Delta T_1$, until the exhaust time T reaches the prescribed time $T_1$, or until the gas pressure in the laser chamber 1 becomes equal to or less than the prescribed pressure value $P_1$.

In S3, when the detected value P of gas pressure in the laser chamber 1 becomes equal to or less than the prescribed pressure value $P_1$, the valve 13 is opened in S6. Then, in S7, the detected value P is compared with a prescribed pressure value $P_2$, where the prescribed pressure value $P_2$ is set to be smaller than the prescribed pressure value $P_1$. If the comparison result shows that the detected value P exceeds the prescribed pressure value $P_2$, the exhaust time T is compared in S8 with a prescribed time $T_2$. If the exhaust time T is equal to or less than the prescribed time $T_2$, the processing advances to S9, then returns to S7 after waiting for a prescribed time $\Delta T_3$. This processing step S9 to wait for the prescribed time $\Delta T_3$, can be omitted. In that case, the prescribed time $T_2$ is set to be larger than the prescribed time $T_1$. After that, S7 through S9 are repeated so that the valve 13 is kept open until the gas pressure in the laser chamber 1 becomes equal to or less than the prescribed pressure value $P_2$. In S7, when the gas pressure in the laser chamber 1 becomes equal to or less than the prescribed pressure value $P_2$, the valve 13 is closed in S10. Then, laser gas introduction processing is executed in S11 when the fresh laser gas is charged in a normal manner. This normal laser gas introduction processing becomes executable, for example, by introducing the fresh laser gas until the total laser gas in laser chamber 1 provides a prescribed pressure value. After that, the procedure advances to RETURN and the processing is ended.

In S8, when the exhaust time T exceeds the prescribed time $T_2$, the gas pressure in the laser chamber 1 is regarded as not being equal to or less than the prescribed pressure value $P_2$ after the prescribed time $T_2$ has elapsed, and it is judged that abnormality has likely occurred in the exhaust control system. Then, the processing advances to S12. Also in S2, when the exhaust time T exceeds the prescribed time $T_1$, the gas pressure in the laser chamber 1 is regarded as not being equal to or less than the prescribed pressure value P1 after the prescribed time $T_1$ has elapsed, and it is judged that abnormality has likely occurred in the exhaust control system. Then, the processing advances to S12. In S12, an abnormality signal is outputted to an alarm buzzer or warning lamp to inform an operator that an abnormality has occurred, as well as being outputted to an external device. Then, in S13, abnormality processing is executed by controlling each relevant valve 13, 34–36, such as to stop supplying or exhausting the laser gas and to stop the laser. After that, the procedure advances to END and the processing is ended.

Thus, when the used laser gas is exhausted from the laser chamber 1 at the time of changing the laser gas, the opening or closing of each relevant valve 13, 34–36 for use to exhaust the used laser gas is controlled based on the gas pressure in the laser chamber 1, so that a predetermined amount of used laser gas can be left in the laser chamber 1, thereby controlling the amount of residual used gas precisely. After that, a fresh laser gas is introduced into the laser chamber 1, and mixed with the residual used gas. After complete introduction, the laser gas contains a prescribed concentration of impurity gas, and this allows the laser to oscillate laser light without any reduction in laser output power from the start of laser oscillation.

Figure 4:
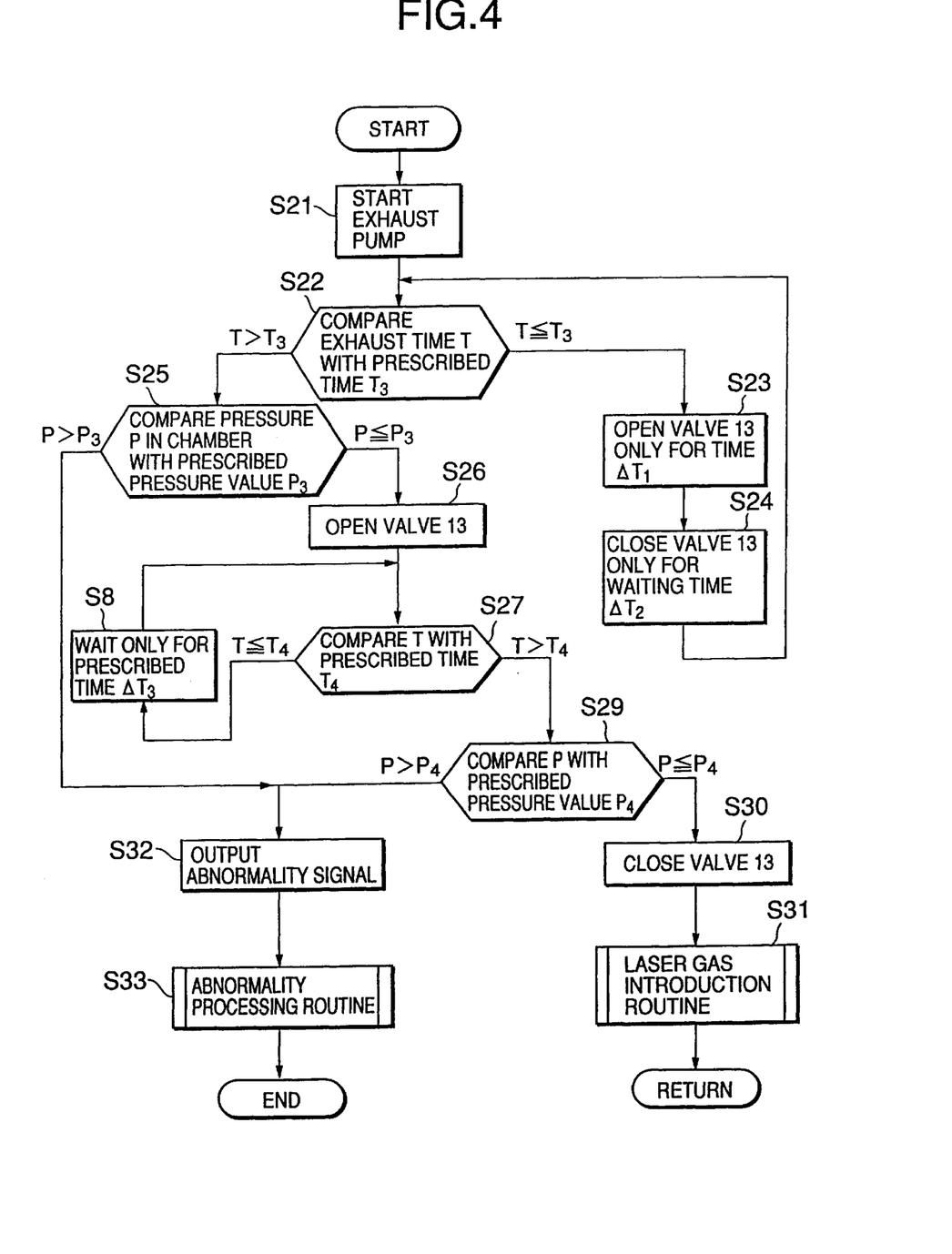
FIG. 4 is a flowchart of used laser gas leaving processing according to a second embodiment.
Figure 5:
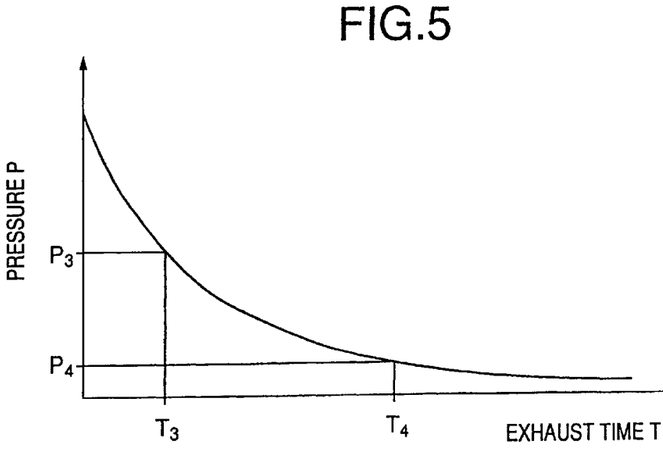
FIG. 5 is a graph for explaining the processing of FIG. 4, showing a relationship between laser gas pressure and exhaust time.

Next, a second embodiment will be described based on FIGS. 4 and 5. A laser in the second embodiment has the same structure as in FIG. 2. FIG. 4 is a flowchart of laser leaving processing executed by the controller 11. FIG. 5 is a diagram for explaining the flowchart, showing a relationship between the laser gas pressure P in the laser chamber 1 and the exhaust time T.

Referring to FIG. 4, the driving command is outputted to the exhaust pump 15 in S21 to start exhausting the used laser gas from the laser chamber 1. Then, in S22, the exhaust time T from the start of exhausting is checked to compare the exhaust time T with a prescribed time $T_3$. If the comparison result shows that the exhaust time T is equal to or less than the prescribed time $T_3$, the gas pressure in the laser chamber 1 is regarded as high, as shown in FIG. 5, and S23 and S24 are executed for the protection of the exhaust pump 15 while gradually exhausting the used laser gas. In other words, the valve 13 is opened in S23 only for the prescribed time $\Delta T_1$, and is closed in S24 only for the prescribed waiting time $\Delta T_2$. After that, the processing returns to S22, and S22 through S24 are repeated. Thus, the opening and closing of the valve 13 are repeated such that the valve 13 is closed during the prescribed waiting time $\Delta T_2$ and is opened during the prescribed time $\Delta T_1$ until the exhaust time T reaches the prescribed time $T_3$. The prescribed time $T_3$ is set to such a maximum exhaust time T that the pressure P in the laser chamber 1 can reach a prescribed pressure value $P_3$ at which the exhaust pump 15 can be protected.

In S22, when the exhaust time T exceeds the prescribed time $T_3$, the detected value P of the gas pressure 12 is compared with the prescribed pressure value $P_3$. If the comparison result shows that the detected value P is equal to or less than the prescribed pressure value $P_3$, the valve 13 is opened in S26. Then, in S27, the exhaust time T is compared with a prescribed time $T_4$. If the exhaust time T becomes equal to or less than the prescribed time $T_4$, the processing advances to S28, and returns to S27 after waiting only for the prescribed time $\Delta T_3$. This processing step S28, to wait for the prescribed time $\Delta T_3$ can be omitted. In that case, the prescribed time T4 is set to be larger than the prescribed time $T_3$. After that, S27 and S28 are repeated so that the valve 13 is kept open until the exhaust time T becomes equal to or more than the prescribed time $T_4$. In S27, when the exhaust time T becomes equal to or more than the prescribed time $T_4$, the detected value P is compared in S29 with a prescribed pressure value $P_4$, where the prescribed pressure value $P_4$ is set to be smaller than the prescribed pressure value $P_3$. If the comparison result shows that the detected value P is equal to or less than the prescribed pressure value $P_4$, the valve 13 is closed in S30. Then, in S31, normal laser gas introduction processing is executed in the same manner as in S11. After that, the procedure advances to RETURN and the processing is ended.

In S29, when the detected value P exceeds the prescribed pressure value $P_4$, the gas pressure in the laser chamber 1 is regarded as not being equal to or less than the prescribed pressure value $P_4$ after the prescribed time $T_4$ has elapsed, and it is judged that abnormality has likely occurred in the exhaust control system. Then, the processing advances to S32. Also in S25, when the detected value P exceeds the prescribed pressure value $P_3$, the gas pressure in the laser chamber 1 is regarded as not being equal to or less than the prescribed pressure value $P_3$ after the prescribed time $T_3$ has elapsed, and it is judged that abnormality has likely occurred in the exhaust control system. Then, the processing advances to S32. In S32, the abnormality signal is outputted to an alarm buzzer or warning lamp to inform an operator that an abnormality has occurred, as well as being outputted to an external device. Then, in S33, abnormality processing is executed by controlling each valve 13 or 34–36, such as to stop supplying or exhausting the laser gas and to stop the laser. After that, the procedure advances to END and the processing is ended.

Thus, when the used laser gas is exhausted from the laser chamber 1 at the time of changing the laser gas, the opening or closing of each relevant valve 13, 34–36 for use to exhaust the gas is controlled based on the exhaust time, so that a prescribed amount of used laser gas is left in the laser chamber 1, thereby controlling the amount of residual used gas precisely. After that, fresh laser gas is introduced into the laser chamber 1, and mixed with the residual used gas. After complete introduction, the laser gas contains a prescribed concentration of impurity gas, and this allows the laser to oscillate laser light without any reduction in laser output power from the start of laser oscillation.

Figure 6:
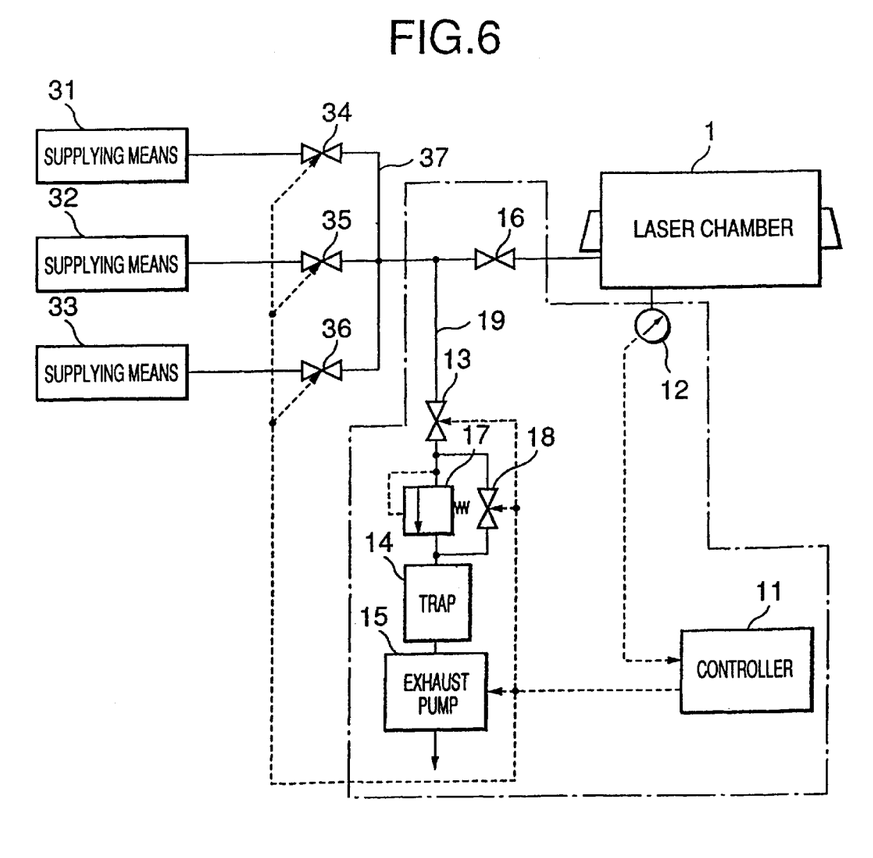
FIG. 6 is a diagram showing the structure of a gas laser according to a third embodiment.

Next, a third embodiment will be described based on FIGS. 6 and 7. FIG. 6 illustrates the structure of a gas laser in this embodiment, in which component parts common to those in FIG. 2 are given the same reference numbers, and the description thereof is omitted. In this embodiment, a pressure control valve 17 and a valve 18 are arranged in parallel between the valve 13 and the trap 14. The pressure control valve 17 exhausts used gas from the laser chamber 1 when the gas pressure in the laser chamber 1 is at least equal to a set pressure value, and stops exhausting when it reaches the set pressure value. The set pressure value is either such a value that the controller 11 can arbitrarily set, or a predetermined fixed value.

Figure 7:
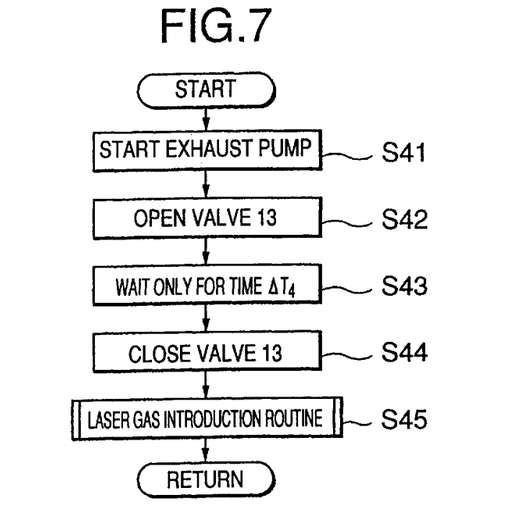
FIG. 7 is a flowchart of used laser gas leaving processing according to the third embodiment.

FIG. 7 is a flowchart of used laser gas leaving processing executed by the controller 11 of the third embodiment. The following description is made based on the drawing. In this case, the valve 16 is open and the other valves 13, 18, and 34–36 are closed.

In S41, the driving command is outputted to the exhaust pump 15 to start exhausting the used laser gas from the laser chamber 1. Then, the valve 13 is opened in S42, and the processing waits only for a prescribed waiting time $\Delta T_4$ in S43. Thus, the used laser gas is exhausted through the pressure control valve 17 so that the gas pressure in the laser chamber 1 can reach a prescribed pressure value set at the pressure control valve 17. Then, the valve 13 is closed in S44, and normal laser gas introduction processing is executed in S45. After that, the procedure advances to RETURN and the processing is ended.

In this flowchart, S2 through S5 in FIG. 3, or S22 through S25 in FIG. 4, can be inserted between S41 and S42, such that the gas pressure is gradually exhausted until the pressure P in the laser chamber 1 reaches a pressure value at which the exhaust pump 15 can be protected even upon consecutive exhaust.

Thus, the used laser gas in the laser chamber 1 is exhausted through the pressure control valve 17, when the laser gas is to be changed, until the gas pressure in the laser chamber 1 becomes the prescribed pressure value set at the pressure control valve 17. Since used laser gas is left in the laser chamber 1 at a concentration proportional to the above prescribed pressure value, the amount of residual used gas can be controlled precisely. After that, a fresh laser gas is introduced into the laser chamber 1, and mixed with the residual used gas. After complete introduction, the laser gas contains a prescribed concentration of impurity gas, and this allows the laser to oscillate laser light without any reduction in laser output power from the start of laser oscillation.

Figure 8:
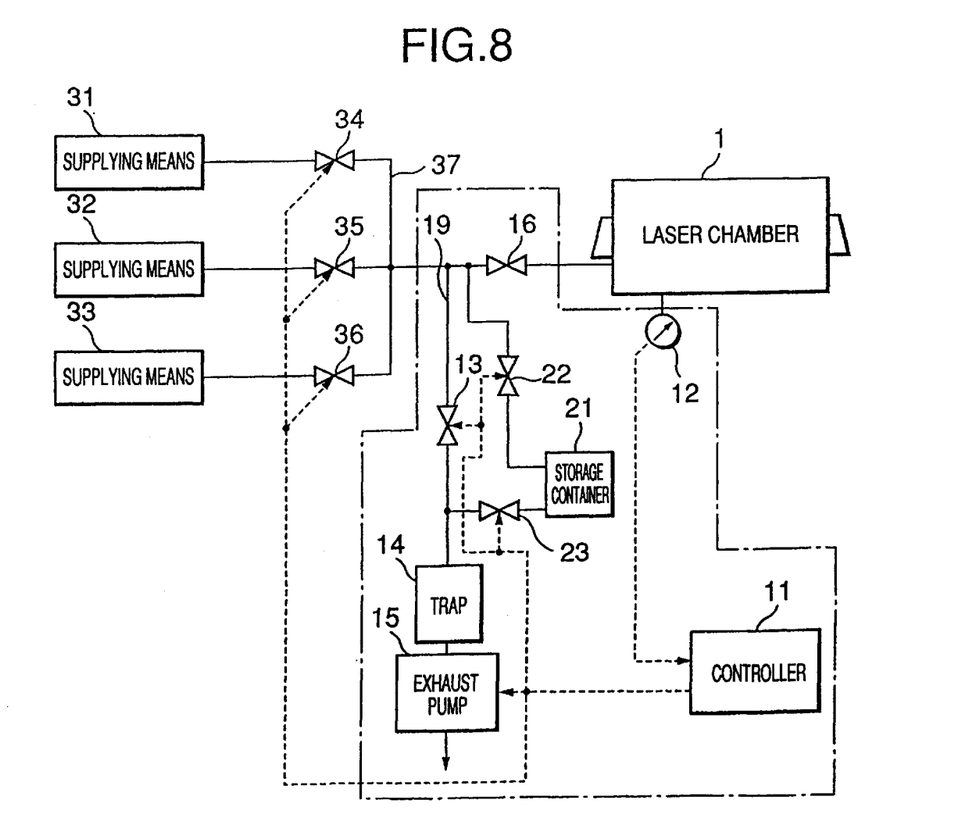
FIG. 8 is a diagram showing the structure of a gas laser according to a fourth embodiment.

Next, a fourth embodiment will be described based on FIGS. 8 and 9. FIG. 8 illustrates the structure of a gas laser in this embodiment, in which component parts common to those in FIG. 2 are given the same reference numbers, and the description thereof is omitted.

The pipe 37 is connected to an I/O part of a laser gas storage container 21 via a valve 22, with another I/O part of the laser gas storage container 21 being connected between the valve 13 and the trap 14 via a valve 23. As is similar to the other valves, each of the valves 22 and 23 is a solenoid valve, or an air driven valve controlled by a solenoid valve. Driving signals for the valves 22 and 23 are provided by the controller 11. Here, the two I/O parts of the laser gas storage container 21 can be replaced with a common part.

Figure 9:
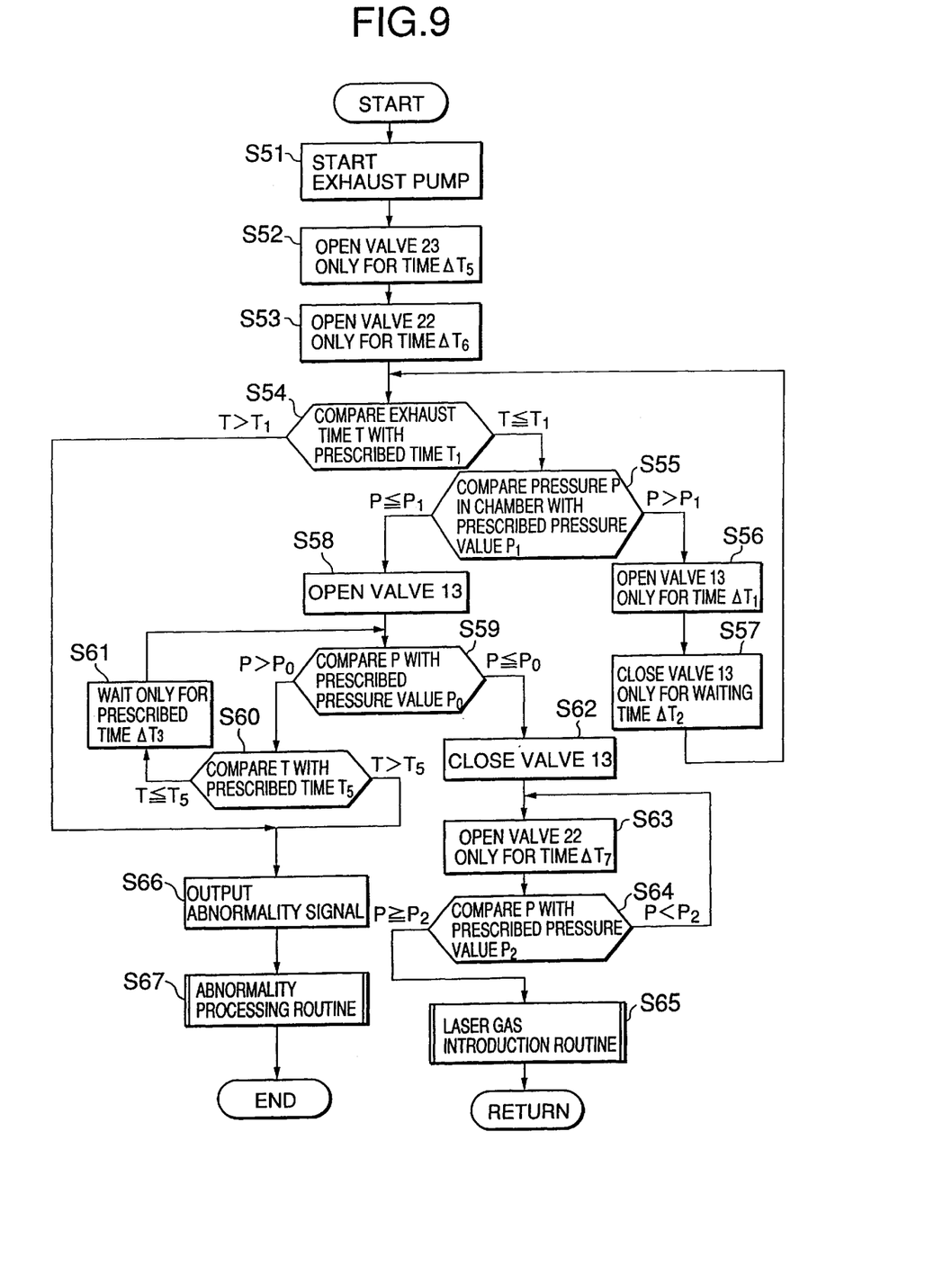
FIG. 9 is a flowchart of used laser gas leaving processing according to the fourth embodiment.

FIG. 9 is a flowchart of used laser gas leaving processing executed by the controller 11 of the fourth embodiment. The following description is made based on the drawing. In this case, the valve 16 is open and the other valves 13, 22, 23, and 34–36 are closed.

In S51, the driving command is outputted to the exhaust pump 15 to start exhausting the used laser gas. In S52, the valve 23 is opened only for a prescribed time $\Delta T_5$, and closed after exhausting the gas in the laser gas storage container 21. Then, in S53, the valve 22 is opened only for a prescribed time $\Delta T_6$, and closed after introducing used laser gas from the laser chamber 1 into the laser gas storage container 21. In the next S54, the exhaust time T from the start of exhausting is checked to compare the exhaust time T with the prescribed time $T_1$. If the comparison result shows that the exhaust time T is equal to or less than the prescribed time $T_1$, the detected value P of the pressure sensor 12 is compared in S55 with the prescribed pressure value $P_1$. If the comparison result shows that the detected value P exceeds the prescribed pressure value $P_1$, the gas pressure in the laser chamber 1 is regarded as high, and S56 and S57 are executed for the protection of the exhaust pump 15 while gradually exhausting the laser gas. In other words, the valve 13 is opened in S56 only for the prescribed time $\Delta T_1$, and closed in S57 only for the prescribed waiting time $\Delta T_2$. After that, the processing returns to S54, and S54 through S57 are repeated. Thus, the opening and closing of the valve 13 are repeated such that the valve 13 is closed during the prescribed waiting time $\Delta T_2$ and opened during the prescribed time $\Delta T_1$ for exhausting the gas until the exhaust time T reaches the prescribed time $T_1$, or until the gas pressure in the laser chamber 1 becomes equal to or less than the prescribed pressure value $P_1$.

In S55, when the detected value P of gas pressure in the laser chamber 1 becomes equal to or less than the prescribed pressure value $P_1$, the valve 13 is opened in S58. Then, in S59, the detected value P is compared with a prescribed pressure value $P_0$, where the prescribed pressure value $P_0$ is such a pressure value as to make the laser chamber 1 a substantial vacuum in which completion of the exhausting can be judged, and it is set smaller than the prescribed pressure value $P_1$. If the comparison result shows that the detected value P exceeds the prescribed pressure value $P_0$, the exhaust time T is compared in S60 with a prescribed time $T_5$. If the exhaust time T is equal to or less than the prescribed time $T_5$, the processing advances to S61, then returns to S59 after waiting for the prescribed time $\Delta T_3$. This processing step S61, to wait for the prescribed time $\Delta T_3$, can be omitted. In that case, the prescribed time $T_5$ is the maximum exhaust time T required until completion of the exhausting of the laser gas, and it is set larger than the prescribed time $T_1$. After that, S59 through S61 are repeated so that the valve 13 can be kept open until the gas pressure in the laser chamber 1 becomes equal to or less than the prescribed pressure value $P_0$. In S59, when the gas pressure in the laser chamber 1 becomes equal to or less than the prescribed pressure value $P_2$, the valve 13 is closed in S62. In the next S63, the valve 22 is opened only for a prescribed time $\Delta T_7$, and is closed after introducing the used laser gas from the laser gas storage container 21 into the laser chamber 1. Then, in S64, the detected value P is compared with the prescribed pressure value $P_2$. If the comparison result shows that the detected value P is smaller than the prescribed pressure value $P_2$, the processing returns to S63 to repeat this processing step. In S64, when the detected value P becomes at least equal to the prescribed pressure value $P_2$, normal laser gas introduction processing is executed in S65. After that, the procedure advances to RETURN and the processing is ended.

In S60, when the exhaust time T exceeds the prescribed time $T_5$, the gas pressure in the laser chamber 1 is regarded as not being equal to or less than the prescribed pressure value $P_0$ after the prescribed time $T_5$ has elapsed, and it is judged that abnormality has likely occurred in the exhaust control system. Then, the processing advances to S66. Also in S54, when the exhaust time T exceeds the prescribed time $T_1$, the gas pressure in the laser chamber 1 is regarded as not being equal to or less than the prescribed pressure value $P_1$ after the prescribed time $T_1$ has elapsed, and it is judged that abnormality has likely occurred in the exhaust control system. Then, the processing advances to S66. In S66, the abnormality signal is outputted to an alarm buzzer or warning lamp to inform an operator that an abnormality has occurred, as well as being outputted to an external device. Then, in S67, abnormality processing is executed by controlling each valve, such as to stop supplying or exhausting the laser gas and to stop the laser. After that, the procedure advances to END and the processing is ended.

Thus, when the used laser gas is exhausted from the laser chamber 1 at the time of changing the laser gas, used laser gas in the laser chamber 1 is first taken and stored into the laser gas storage container 21, and then the laser chamber 1 is exhausted until the laser chamber 1 becomes a substantial vacuum. Subsequently, a prescribed amount of used laser gas stored in the laser gas storage container 21 is introduced into the laser chamber 1. Such gas introduction is so controlled that the gas pressure in the laser chamber 1 becomes the prescribed pressure value. Since the used laser gas is introduced into the laser chamber 1 at a concentration proportional to the above prescribed pressure value, the amount of residual used gas can be controlled precisely. After that, fresh laser gas is introduced into the laser chamber 1, and mixed with the residual used gas. After complete introduction, the laser gas contains a prescribed concentration of impurity gas, and this allows the laser to oscillate laser light without any reduction in laser output power from the start of laser oscillation.

Next, a fifth embodiment will be described based on FIGS. 10 and 11. In this embodiment, there is provided means for adding an impurity gas into the laser gas (hereinafter, called the impurity gas adding mean) when the laser gas is changed.

Figure 10:
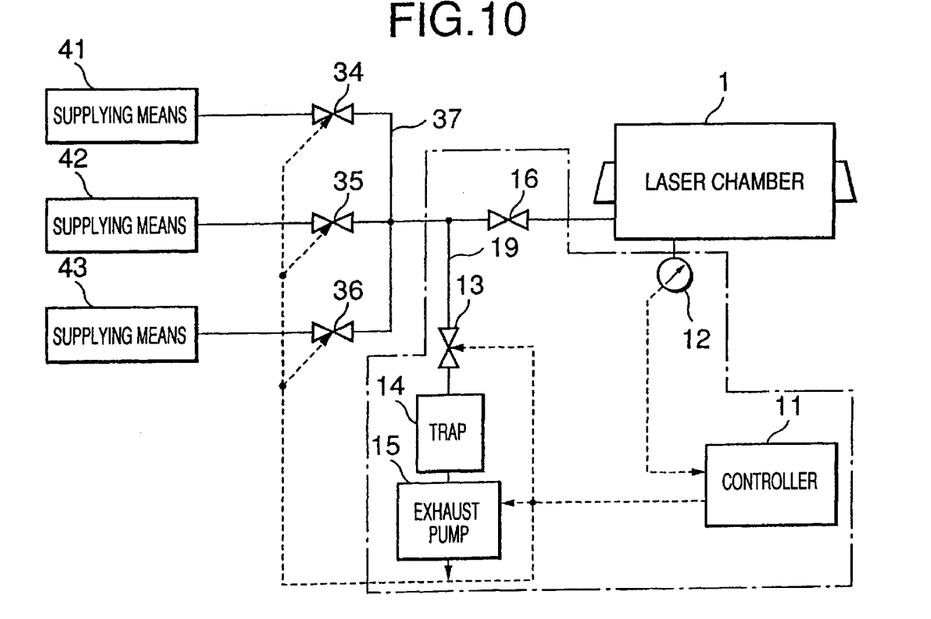
FIG. 10 is a diagram showing the structure of a gas laser according to a fifth embodiment.

FIG. 10 illustrates the structure of a gas laser in this embodiment, in which component parts common to those in FIG. 2 are given the same reference numbers, and the description thereof is omitted. Laser gas supplying means 41–43, which supply laser gas into the laser chamber 1, are gas cylinders in many cases. In this embodiment, at least one of the laser gas supplying means 41–43 contains a prescribed concentration of impurity gas as the impurity gas adding means. FIG. 10 shows an Ar-F excimer laser as an example. The gas laser includes buffer gas supplying means 41 for supplying a buffer gas of neon or helium, argon supplying means 42 for supplying a mixture of argon and neon, and fluorine supplying means 43 for supplying a mixture of fluorine and neon, where an impurity gas is added to at least one of the laser gas supplying means 41–43. These gas supplying means 41–43 are connected to valves 34, 35, and 36, respectively. The valves 34, 35, and 36 are connected to the laser chamber 1 through the pipe 37 and the valve 16.

Figure 11:
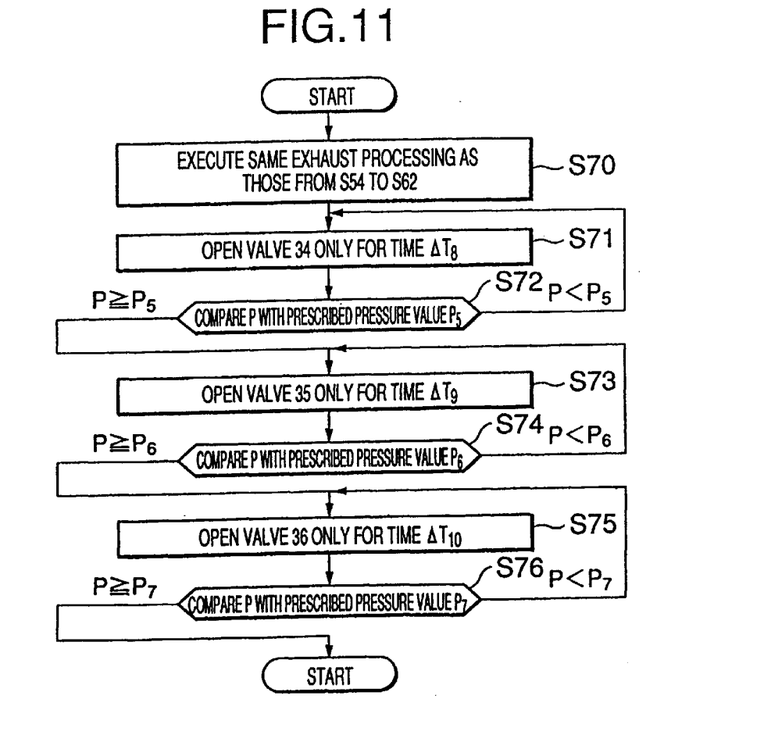
FIG. 11 is a flowchart of used laser gas leaving processing according to the fifth embodiment.

FIG. 11 is a flowchart of impurity gas addition processing executed by the controller 11 in the gas laser thus configured. In this case, the valve 16 is open and the other valves 13 and 34–36 are closed.

In S70, exhaust processing is executed in the same manner as the processing from S54 to S62. Then, in S71, the valve 34 is opened only for a prescribed time $\Delta T_8$ so that the buffer gas will be introduced from the buffer gas supplying means 41 into the laser chamber 1. After that, the valve 34 is closed. Then, in S72, the detected value P of the pressure sensor 12 is compared with a prescribed pressure value $P_5$. If the comparison result shows that the detected value p is smaller than the prescribed pressure value $P_5$, the procedure returns to S71 and the same processing is repeated. In S72, when the detected value P becomes at least equal to the prescribed pressure value $P_5$, the valve 35 is opened in S73 only for a prescribed time $\Delta T_9$ so that the mixture of argon and neon will be introduced from the argon supplying means 42 into the laser chamber 1. After that, the valve 35 is closed. Then, in S74, the detected value P is compared with a prescribed pressure value $P_6$. If the comparison result shows that the detected value P is smaller than the prescribed pressure value $P_6$, the procedure returns to S73 and the same processing is repeated. In S74, when the detected value P becomes at least equal to the prescribed pressure value $P_6$, the valve 36 is opened in S75 only for a prescribed time $\Delta T_{10}$ so that the mixture of fluorine and neon will be introduced from the fluorine supplying means 43 into the laser chamber 1. After that, the valve 36 is closed. Then, in S76, the detected value P is compared with a prescribed pressure value $P_7$. If the comparison result shows that the detected value P is smaller than the prescribed pressure value $P_7$, the procedure returns to S75 and the same processing is repeated. In S75, when the detected value P becomes at least equal to the prescribed pressure value $P_7$, the procedure advances to RETURN, and this subroutine is ended.

Since a prescribed concentration of impurity gas is added into the laser gas, the laser gas, after complete introduction in the laser chamber 1, also contains the prescribed concentration of impurity gas, and this allows the laser to oscillate laser light without any reduction in laser output power from the start of laser oscillation.

Next, a sixth embodiment will be described based on FIGS. 12 and 13. In this embodiment, there is provided an impurity gas container 44 as the impurity gas adding means.

Figure 12:
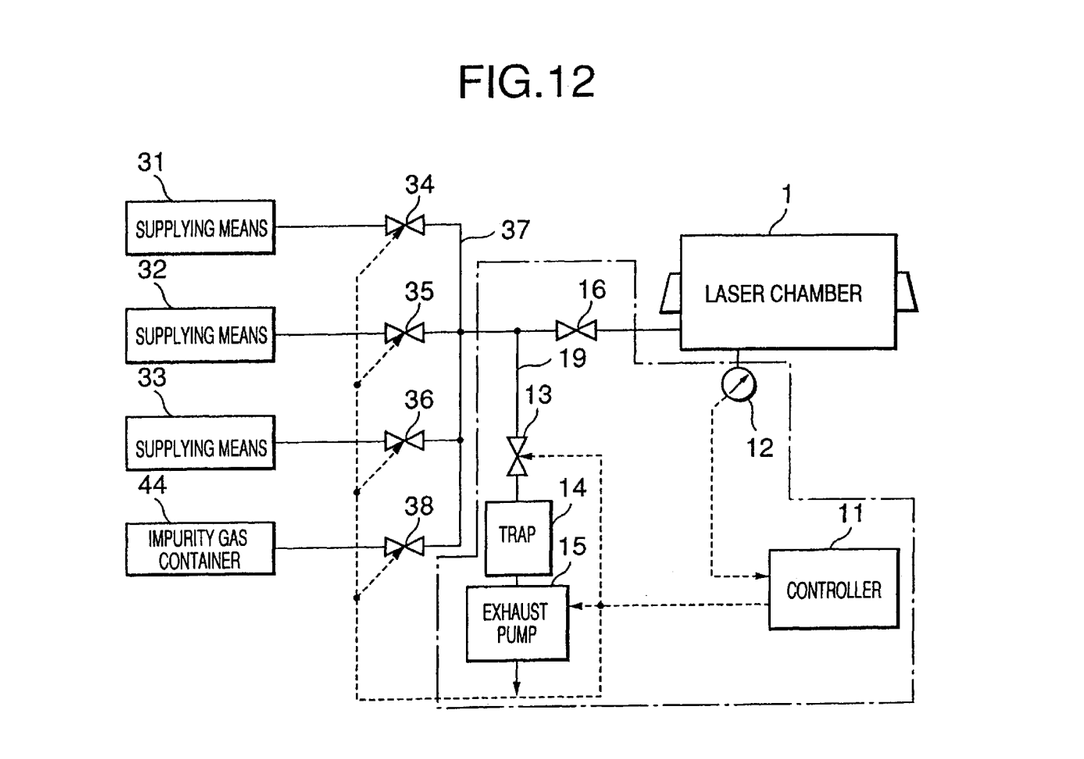
FIG. 12 is a diagram showing the structure of a gas laser according to a sixth embodiment.

FIG. 12 illustrates the structure of a gas laser in this embodiment, in which component parts common to those in FIG. 2 are given the same reference numbers, and the description thereof is omitted. The impurity gas container 44 can be a container, such as a gas cylinder, filled with an impurity gas, and is connected to a valve 38. The valve 38 is connected to the laser chamber 1 via the pipe 37 and the valve 16. The driving signal for the valve 38 is provided by the controller 11.

Figure 13:
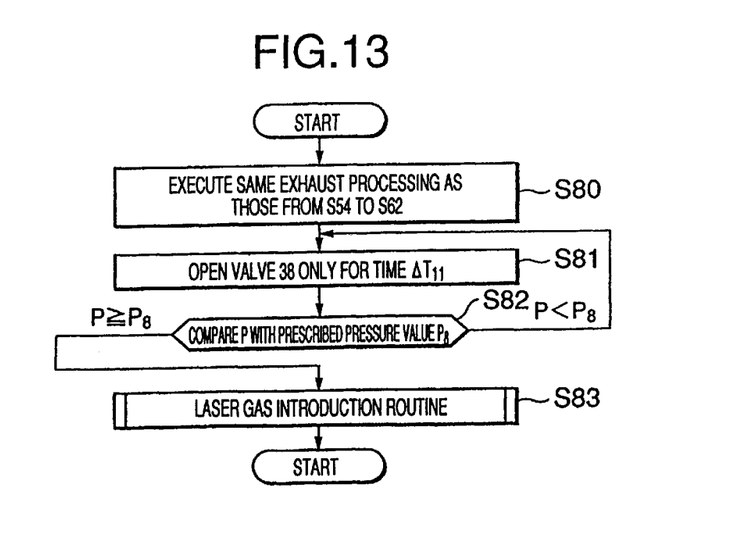
FIG. 13 is a flowchart of used laser gas leaving processing according to the sixth embodiment.

FIG. 13 is a flowchart of impurity gas addition processing executed by the controller 11 in this sixth embodiment. The following description is made in detail with reference to the drawing. In this case, the valve 16 is open and the other valves 13, 34–36, and 38 are closed.

In S80, exhaust processing is executed in the same manner as the processing from S54 to S62. Then, in S81, the valve 38 is opened only for a prescribed time $\Delta T_{11}$ so that an impurity gas will be introduced from the impurity gas container 44 into the laser chamber 1. After that, the valve 38 is closed. Then, in S82, the detected value P of the pressure sensor 12 is compared with a prescribed pressure value $P_8$. If the comparison result shows that the detected value P is smaller than the prescribed pressure value $P_8$, the processing returns to S81, and the same processing is repeated. In S83, when the detected value P is at least equal to the prescribed pressure value $P_8$, normal laser gas introduction processing is executed in S83. After that, the procedure returns and the processing is ended.

After the completion of the exhausting of the laser gas from the laser chamber, the impurity gas is thus introduced into the laser chamber until the impurity gas becomes a prescribed pressure value. After that, each laser gas is introduced into the laser chamber 1 until the laser gas reaches a respectively prescribed pressure value. Thus, the concentration of impurity gas in the laser gas can be controlled precisely, and this allows the laser to oscillate laser light without any reduction in laser output power from the start of laser oscillation.

Next, a seventh embodiment will be described based on FIG. 14. In this embodiment, there is provided an impurity gas generator 45 as the impurity gas adding means.

Figure 14:
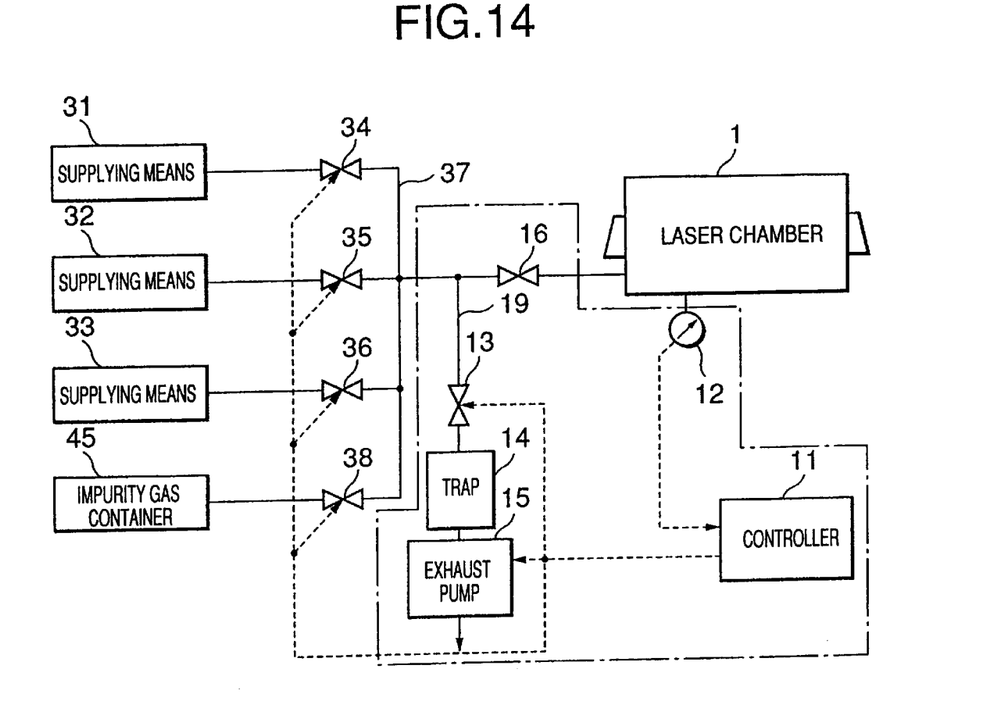
FIG. 14 is a diagram showing the structure of a gas laser according to a seventh embodiment.

FIG. 14 illustrates the structure of this embodiment, in which component parts common to those in FIG. 2 are given the same reference numbers, and the description thereof is omitted. The impurity gas generator 45 is to generate an impurity gas. The gas generation can be achieved by a chemical reaction, or by heating impurity occluding material. As an example of the impurity occluding material, porous metallic fluoride [NaF+LiF] can be cited. In this case, a container with the porous metallic fluoride stored therein is arranged in a path for laser gas containing an impurity gas so that the impurity gas will be occluded into the porous metallic fluoride. When such impurity occluding material is stored in the impurity gas generator 45, the generated amount of impurity gas can be controlled by controlling the heating temperature of the material. The impurity gas generator 45 is connected to the valve 38.

In such an arrangement, the process of introducing an impurity gas into the laser gas works in the same manner as in the flowchart of FIG. 13. The occluding material in the impurity gas generator 45 is heated to a prescribed temperature to generate a prescribed pressure of impurity gas in the impurity gas generator 45. In this condition, the valve 38 is opened only for the prescribed time $\Delta T_{11}$ in the same manner as in S81 and S82 of FIG. 13 so that an impurity gas will be introduced from the impurity gas generator 45 into the laser chamber 1. After that, the valve 38 is closed. The impurity gas introduction processing is repeated until the pressure P in the laser chamber 1 reaches the prescribed pressure value $R_8$. Alternatively, the introduced amount of impurity gas can be adjusted by controlling the heating temperature of the impurity occluding material instead of opening and closing control of the valve 38. In this case, the impurity gas is also introduced until the pressure P in the laser chamber 1 reaches the prescribed pressure value $P_8$. After the impurity gas has been introduced, normal laser gas introduction processing is executed in S83. After that, the procedure returns and the processing is ended.

As is similar to the sixth embodiment, the impurity gas is introduced into the laser chamber 1 until it reaches the prescribed pressure value, and then each laser gas is introduced into the laser chamber until it reaches a respectively prescribed pressure value. Thus, the concentration of impurity gas in the laser gas can be controlled precisely, and this allows the laser to oscillate laser light without any reduction in laser output power from the start of laser oscillation.

INDUSTRIAL APPLICABILITY

The present invention is effective for gas lasers such as excimer lasers which can obtain a prescribed high laser output power from the start of laser oscillation immediately after the laser gas is changed.

What is claimed is:

1. A gas laser comprising:
    a laser chamber for containing a laser gas which becomes used laser gas upon being used to provide oscillating laser light;
    means for exhausting from said laser chamber, as part of an operation for replacing the used laser gas in said laser chamber with new laser gas, at least a portion of used laser gas contained in said laser chamber;
    means for charging fresh laser gas to said laser chamber as part of said operation for replacing the laser gas in said laser chamber with new laser gas; and
    means for providing in the laser chamber part of the used laser gas for mixing with the fresh laser gas which is charged as part of said operation such that a concentration of used laser gas in the new laser gas is within the range of 1.5–60%.

2. A gas laser in accordance with claim 1, wherein said means for providing comprises:
    a laser gas storage container;
    means for passing used laser gas from said laser chamber to said laser gas storage container to store the thus passed used laser gas; and
    means for injecting a prescribed amount of used laser gas from said laser gas storage container into said laser chamber.

3. A gas laser in accordance with claim 1, wherein said means for charging comprises a plurality of gas supplying means for supplying laser gas components to said laser chamber, and wherein one of said laser gas components comprises an impurity gas.

4. A gas laser in accordance with claim 1, wherein said means for providing is a gas exhaust control mechanism for controlling exhausting of the used laser gas from said laser chamber such that a prescribed amount of used laser gas is left in the laser chamber.

5. A gas laser in accordance with claim 4, wherein said gas exhaust control mechanism comprises:

a pressure sensor for detecting gas pressure in said laser chamber;

a valve for exhausting used laser gas from said laser chamber; and a controller for outputting a driving command to said valve to leave a prescribed amount of used laser gas in the laser chamber based on a detection signal from said pressure sensor.

6. A gas laser in accordance with claim 4, wherein said gas exhaust control mechanism comprises:

a valve for exhausting used laser gas from said laser chamber; and a controller for measuring a gas exhaust time, from a start of exhausting of the used laser gas, and for outputting a driving command to said valve so as to leave a prescribed amount of used laser gas in said laser chamber based on the thus measured gas exhaust time.

7. A gas laser in accordance with claim 4, wherein said gas exhaust control mechanism comprises:

a pressure control valve for exhausting used laser gas from said laser chamber when gas pressure in said laser chamber exceeds a prescribed value, and for stopping the exhausting of said used laser gas from said laser chamber when the gas pressure in said laser chamber becomes equal to or less than said prescribed value.

8. A gas laser comprising:

a laser chamber for containing a laser gas which becomes used laser gas upon being used to provide oscillating laser light;

means for exhausting from said laser chamber, as part of an operation for replacing the used laser gas in said laser chamber with new laser gas, at least a portion of used laser gas contained in said laser chamber;

means for charging fresh laser gas to said laser chamber as part of said operation for replacing the used laser gas; and impurity gas means for providing in said laser chamber a prescribed amount of impurity gas for mixing with the thus charged fresh laser gas as part of said operation for replacing the used laser gas.

9. A gas laser in accordance with claim 8, wherein said impurity gas means comprises a cylinder filled with laser gas containing a prescribed concentration of impurity gas.

10. A gas laser in accordance with claim 8, wherein said impurity gas means comprises:

an impurity gas container for storing impurity gas;

a valve for controlling an injection of the impurity gas from the impurity gas container into said laser chamber; and a controller for outputting a driving command to said valve to inject a prescribed amount of impurity gas into said laser chamber.

11. A gas laser in accordance with claim 8, wherein said impurity gas means comprises:

an impurity gas generator for generating impurity gas;

a valve for controlling an injection of impurity gas from the impurity gas generator into said laser chamber; and a controller for outputting a driving command to said valve to provide a prescribed amount of impurity gas for mixing with fresh laser gas in said laser chamber.

12. A gas laser in accordance with claim 8, wherein said impurity gas is at least one of hydrogen fluoride, carbon tetrafluoride, and oxygen.

* * * * *